(12) United States Patent
Okano

(10) Patent No.: US 11,794,144 B2
(45) Date of Patent: Oct. 24, 2023

(54) GAS ADSORBENT BODY, METHOD FOR PRODUCING THEREOF, AND CARBON DIOXIDE GAS CONCENTRATION DEVICE

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 667 days.

(21) Appl. No.: 16/976,718

(22) PCT Filed: Aug. 2, 2019

(86) PCT No.: PCT/JP2019/030420
§ 371 (c)(1),
(2) Date: Aug. 28, 2020

(87) PCT Pub. No.: WO2020/044944
PCT Pub. Date: Mar. 5, 2020

(65) Prior Publication Data
US 2021/0039036 A1 Feb. 11, 2021

(30) Foreign Application Priority Data
Aug. 29, 2018 (JP) .................................. 2018-159864

(51) Int. Cl.
*B01D 53/02* (2006.01)
*B01J 20/22* (2006.01)

(52) U.S. Cl.
CPC .............. *B01D 53/02* (2013.01); *B01J 20/22* (2013.01); *B01D 2201/08* (2013.01);
(Continued)

(58) Field of Classification Search
None
See application file for complete search history.

(56) References Cited

U.S. PATENT DOCUMENTS

| 6,045,915 | A | * | 4/2000 | Bou | ...................... C04B 35/536 |
| | | | | | 428/137 |
| 2004/0118287 | A1 | * | 6/2004 | Jaffe | .................. B01D 53/0423 |
| | | | | | 96/121 |

(Continued)

FOREIGN PATENT DOCUMENTS

| JP | 61-254220 A | 11/1986 |
| JP | 4-83509 A | 3/1992 |

(Continued)

OTHER PUBLICATIONS

International Search Report dated Oct. 21, 2019, in corresponding International Patent Application No. PCT/JP2019/030420.

(Continued)

*Primary Examiner* — Jason M Greene
(74) *Attorney, Agent, or Firm* — STAAS & HALSEY LLP

(57) ABSTRACT

A $CO_2$ concentration device has an adsorbent body formed from sheet material. Solid adsorbent particles are adhered onto at least a single surface of the sheet material and then the sheet material is wound onto itself or laminated in layers. The adsorbent body is divided into at least into a processing zone and a regeneration zone. $CO_2$ is adsorbed in the processing zone when the processing zone is wet with water and a $CO_2$ containing gas is passed through. The regeneration zone desorbs $CO_2$ when saturated steam is passed through. Condensation heat from the steam condensing causes $CO_2$ desorption. The solid adsorbent particles may be aligned in a linear or a staggered arrangement when the solid adsorbent particles are adhered to the sheet material to follow a gas flow and form gas introduction paths between adjacent layers of the sheet material.

20 Claims, 12 Drawing Sheets

(52) U.S. Cl.
CPC .... *B01D 2201/32* (2013.01); *B01D 2253/308* (2013.01); *B01D 2256/22* (2013.01); *B01D 2257/504* (2013.01); *B01D 2259/4009* (2013.01)

(56) References Cited

U.S. PATENT DOCUMENTS

| | | | |
|---|---|---|---|
| 2005/0211100 A1* | 9/2005 | Doughty | B01D 53/02 96/154 |
| 2012/0160099 A1* | 6/2012 | Shoji | B01D 53/1475 96/144 |
| 2016/0175772 A1* | 6/2016 | Maruyama | B01D 53/62 422/180 |

FOREIGN PATENT DOCUMENTS

| | | |
|---|---|---|
| JP | 6-91128 B2 | 4/1994 |
| JP | 7-16576 B2 | 3/1995 |
| JP | 10-175262 A | 6/1998 |
| JP | 11-76733 A | 3/1999 |
| JP | 2000-246039 A | 9/2000 |
| JP | 2001-205018 A | 7/2001 |
| JP | 2001-205045 A | 7/2001 |
| JP | 3080796 U | 10/2001 |
| JP | 2009-209314 A | 9/2009 |
| JP | 2010-227830 A | 10/2010 |
| JP | 2016-117052 A | 6/2016 |
| JP | 2017-23995 A | 2/2017 |
| JP | 2018-61917 A | 4/2018 |
| WO | WO 2011/013332 A1 | 2/2011 |
| WO | WO 2014/208038 A1 | 12/2014 |

OTHER PUBLICATIONS

Written Opinion of the International Searching Authority dated Oct. 21, 2019, in corresponding International Patent Application No. PCT/JP2019/030420.

* cited by examiner

PARTICLE GUIDE (FIXATION)

PARTICLE GUIDE (OSCILLATION)

ADSORBENT PARTICLE DOUBLE SIDE ADHESION DEVICE

GAS ADSORBENT BODY, METHOD FOR PRODUCING THEREOF, AND CARBON DIOXIDE GAS CONCENTRATION DEVICE

CROSS REFERENCE TO RELATED APPLICATIONS

This application is a U.S. National Stage Application, which claims the benefit under 35 U.S.C. § 371 of International Patent Application No. PCT/JP2019/030420 filed Aug. 2, 2019, which claims the foreign priority benefit under 35 U.S.C. § 119 of Japanese Patent Application No. 2018-159864 filed Aug. 29, 2018, the contents of which are incorporated herein by reference.

BACKGROUND

The inventor's proposal relates to a gas adsorbent body that recovers carbon dioxide gas at a high recovery rate by a thermal swing method using an adsorption promoting effect due to desorption by condensation heat of water vapor and evaporative cooling of condensed water, can be concentrated to a high concentration, has high durability, has relatively small pressure loss, can be reduced in size, can be produced at a relatively low production cost, a method for producing thereof, and a carbon dioxide concentration device.

Adsorption and absorption phenomena are different but similar phenomena. Therefore, in a case where both elements are present, a term of sorption is used. In a case where an amine-based carbon dioxide adsorbent is impregnated with a porous adsorption material such as mesoporous silica, it may be called adsorption since there is a great influence by not only properties of an absorbent but also a pore shape of an adsorbent. Hereinafter, the term of adsorption is used to avoid redundancy, but sorption is all included.

Examples of a gas processing device using a solid adsorbent include a dehumidifier, an organic solvent concentration device, a gas separator, and the like. In such a gas processing device, a processing is operated in a cycle in which a gas to be processed flows into a tower filled with adsorbent particles to adsorb a target gas in the gas in a processing step, and in a subsequent regeneration step, a heated desorption gas flows to desorb adsorbed gas and take out thereof, and the step returns to the processing step again. There is a case where the remaining gas from which the target adsorption gas has been removed is useful, and conversely, there is also a case where the target gas is useful.

As a gas separation device using a particulate adsorbent filled layer, there is a fixed-bed multi-tower adsorption concentration device, or a fluidized bed type and a moving bed type. In addition, according to the regenerating method, the method is divided into a thermal swing method and a pressure swing method. In addition, in an adsorption layer formed in a honeycomb shape not in a particulate adsorbent, the pressure loss is small for a large contact area with the processing gas, and the strength is high despite the light weight. Therefore, it is employed in a large gas processing device such as a rotor type VOC concentration device and is widely used.

SUMMARY

The present application relates not to a simple thermal swing method, but to an adsorbent body that is targeted to a wet thermal swing method by an adsorption promoting effect due to desorption by condensation heat of water vapor and evaporative cooling of condensed water, a method for producing thereof, and a carbon dioxide gas concentration device. In addition, the present application suggests an adsorbent body that is neither a filled layer nor a honeycomb, has each property, and resolves each defect, a method for producing thereof, and a high-efficiency energy-saving carbon dioxide gas recovery and concentration device using the adsorbent body.

A general thermal swing gas adsorption separation method can be largely divided into a fixed bed method, a fluidized bed method, and a moving bed (layer) method using a particulate adsorbent-filled bed, and a honeycomb rotor adsorption/concentration method using a honeycomb-shaped adsorbent body. A method using a filled layer can be realized at a relatively low cost, but the method has disadvantages that there is a high pressure loss, abrasion and damage of particles due to the flow of the particulate adsorbent occur, and deviation of filling occurs. The method of using the honeycomb-shaped adsorbent body has advantages that a surface area is wide but a pressure loss is small, and the strength is high despite the light weight, and thus a large device can be easily realized. However, the method has disadvantages that the processing man-hour of a honeycomb adsorbent body is great and the processing is difficult, and thus the cost is high.

Patent Document 1, Japanese Patent Publication No. 4-83509, and Patent Document 2, Japanese Patent Publication No. 6-91128, disclose a method in which, using a rotor of a disk-shaped container in which a particulate carbon dioxide adsorbent is divided and accommodated in a bucket-shaped container, a rotor is rotated, or a rotor is fixed to rotate a duct device, carbon dioxide is adsorbed in an adsorption zone, and high-concentration carbon dioxide is desorbed and recovered due to heated gas in the desorption zone. Although these methods can continuously perform absorption and desorption, the disadvantage of adsorbent particles has not been solved.

Patent Document 3, International Publication No. WO 2014/208038, discloses a moving bed type carbon dioxide recovery and concentration technology. The carbon dioxide is adsorbed through a raw material gas into an adsorption tower filled with the carbon dioxide adsorbent, and after the adsorption, the adsorbent moves to a regeneration tower and is heated by condensation of water vapor to desorb and recover the carbon dioxide. In addition, the carbon dioxide adsorbent achieves an object in a continuous cycle in which the carbon dioxide adsorbent moves to the adsorption tower again through a drying tower and adsorbs carbon dioxide. Even in this method, the filled layer of adsorbent particles only moves and the disadvantages of the filled layer is not solved.

Patent Documents 1, 2, and 3 have disadvantages of using a particulate adsorbent, that is, a problem that the particle-filled layer has a large airflow resistance, or a large particle has an adverse effect on performance due to a difference in diffusion resistance between the outside and the inside of the particle, and thus there is a restriction on improvement in performance. On the other hand, in small adsorbent particles, the velocity of the processing gas is restricted since the particles float by the gas flow. Breakage wear of the adsorbent particles occurs as the particles flow. In addition, in a case where a porous adsorbent having a low internal diffusion resistance is used for improving the performance, the strength of the particles is reduced, and there is a problem in that abrasion and breakage easily occur due to the flow or movement. In addition, in a case where water vapor or saturated steam is used as the desorption gas as in Patent Document 3, the particles aggregate due to the capillary behavior of condensed water, or the pores are closed by the condensed water, and thus the device design becomes difficult, for example, a separate drying step is required.

Patent Document 4, Japanese Patent Publication No. 2001-205045, suggests a rotor having a honeycomb structure, and a pressure loss is reduced. In addition, there is disclosed a flow in which the rotor sequentially passes through an adsorption zone, a desorption zone due to heated carbon dioxide gas, a gas purge zone, and a regeneration cooling zone (hereinafter, indicated as cooling zone), and returns to the adsorption zone again. The honeycomb adsorbent body has advantages that a pressure loss is low, a honeycomb wall is thin and thus contact efficiency is high, the strength is high despite the light weight, and an increase in the size is easy. On the other hand, there is a limit to a filling density of the adsorbent in terms of the production method. In addition, there is also a disadvantage that the number of processing steps is great, for example, fine pulverization, coating, or impregnation, corrugating processing, and rotor, and thus the cost becomes high.

Patent Document 5, Japanese Patent Publication No. 7-16576, discloses a method in which a small particulate adsorbent is adhered to both surfaces of a sheet, and further a corrugating processing and winding are performed to obtain a heat exchange adsorbent body. Although many similar patent documents are found, it is difficult to increase the density of the adsorbent in the corrugated laminated honeycomb, and thus the cost becomes high. The inventor's proposal involves a method in which a corrugating processing is not performed, and a laminated adsorbent body having an adsorbent particle serving also as a separator support, having a lower density than a filled layer, and having a high filling density than the laminated honeycomb is obtained, and thus is fundamentally different.

Patent Document 6, Japanese Patent Publication No. 2000-246039, discloses an adsorption processing member in a case in which a zeolite-based particle is adhered and fixed onto a gas-permeable filter material, and is used by being ventilated in one or two layers, and in a case in which a zeolite-based particle is adhered onto a non-gas-permeable sheet, and is used in a single layer with a single surface open. However, the adsorption processing member is used for a small-sized device for air cleaners for domestic use or automobiles, and is not applied to large-capacity gas processing.

Patent Document 7, Japanese Patent Publication No. 2001-205018, discloses a method in which, after a hot-melt adhesive sheet and an adsorbent particle group such as active carbon and ion exchange resin are alternately laminated, heating is performed, and a heat-melt sheet is melt to prepare an adsorbent body in which adsorption material particle groups are alternately adhered. According to this method, no problem occurs due to the flow of the adsorbent particles. However, although the heat-melt sheet is not densely filled before heating, the heat-melt sheet is most densely filled in a step of heating and melting the heat-melt sheet, and thus the disadvantage due to dense filling cannot be solved.

Patent Document 8, Japanese Patent Publication No. 2009-209314, discloses an adsorbent body in which particles of an ion exchange resin and a powdery hot-melt resin are mixed, filled, and heated to melt the hot-melt resin, a membrane of the hot-melt resin is formed on a particle surface of the resin, adhered, and integrated, and a micropore is formed on the resin membrane due to water vapor discharged from the resin at the same time. In addition, at the time of integration, it is possible to obtain an adsorption molded body having a small pressure loss by forming a through hole with a large amount of pins. However, even with this method, the group of adsorption particles is fixed, but the problem of densely filling other than through holes cannot be solved.

Patent Document 9, Japanese Patent Publication No. 2010-227830, discloses a method in which an active carbon particle and a particulate thermoplastic resin adhesive are mixed, placed in a container, and heated to melt the thermoplastic resin adhesive to adhere the active carbon particle, and at the same time, a large number of needles are placed in the container and pulled out to generate a through hole, thereby preparing a gas adsorption filter having high permeability.

Patent Documents 6, 7, 8, and 9 disclose a method in which a particulate active carbon or an ion exchange resin is filled in a molding container, and a hot-melt resin adhesive is heated and melt-adhered to obtain an adsorbent body with particulate adsorbents cohered. However, in any method, the density of the particles needs to be approximated to most dense filling. In addition, it is an adsorbent body in which a regeneration temperature cannot be raised to a heat-resistant temperature or more of a hot-melt adhesive, and which is assumed to be disposable.

Patent Document 10, Japanese Patent Publication No. 11-76733, discloses a method of preparing an adsorbent body by forming a sheet electrostatically implanted with a short active fiber in a sheet-shaped base material, and laminating a plurality of the sheets. However, a fibrous adsorbent is limited to a part of adsorbent that can be made into a fiber, and the application range is narrow. Therefore, a high cost is inevitable.

A honeycomb adsorbent has a wide contact area but a low pressure loss, and is lightweight but strong. Therefore, the honeycomb adsorbent body is easily applied to a large-sized processing device. However, there is a limitation in increasing the density, and there is also a problem in that the cost tends to be high in terms of the production. A method of producing a honeycomb adsorbent body is largely divided into a method of corrugating a sheet obtained by mixing or adhesion-coating an adsorbent and performing honeycomb processing, a method of impregnating and supporting a honeycomb-processed base material in a slurry containing the adsorbent, a method of embossing clay containing an adsorbent and performing honeycomb-forming, and the like. In a case of preparing the above honeycomb adsorbent body as described above, a fine powdered adsorbent of several microns to several tens of microns can be used as it is, but in a case of spherical silica gel or ion exchange resin particles, several microns to several tens of microns are required to be pulverized in advance.

In both of an impregnation method and an embossing method, a binder is required to fix the adsorbent fine particles. Therefore, as the particle diameter becomes smaller, the adhesion area per weight of the adsorbent becomes larger. In a case where the amount of the binder is large, the performance is deteriorated by covering a surface of the adsorbent, and in a case where the amount is small, there is a risk of falling off of the adsorbent. Therefore, great caution should be taken in selecting the binder or determining the use amount. In a case where a honeycomb rotor adsorbent body is prepared by performing corrugating and winding, a sheet thickness t, a corrugated peak pitch p, and a peak height h have an optimal ratio range, and in a range of $t=0.1$ to 1, $p=2$ to 6, and $h=0.8$ to 4 from the required performance and workability. In order to increase the number of cells for high performance, the sheet should be thinner, and this increases the cost. In a case where the sheet thickness t is increased in order to achieve an adsorbent body containing an adsorbent at a high density, processing cannot be performed unless the number of cells is reduced. Even in a case of impregnation and supporting on a honeycomb base material, the same ratio should be used. In the case of the honeycomb adsorbent body, an opening rate is practically up to about 50%, an adsorbent content excluding the base material and the binder is around 50%, and an adsorbent filling density is practically about 25 Vol %, which is a processing limit.

The adsorbent bed filled with the particulate adsorbent is only required to fill the adsorbent into an adsorption container, and thus an adsorption layer can be easily configured. However, on the other hand, the filling density cannot be adjusted and the pressure loss is high, particles flow due to the gas flow, abrasion and breakage of the particles occur, and this causes rise of pressure loss due to generation of dust or partial blockage of the filled layer and the like.

In addition, in the filled layer using a particulate adsorbent, it is advantageous to increase a contact area with the processing gas by reducing the size of the particles, from a viewpoint of high performance and reduction in the size. However, as the size of the particle becomes smaller, the pressure loss becomes larger, the flow due to the gas flow is also easily induced, the design becomes difficult, and an increase in the size of the device becomes difficult.

In addition, in terms of the filling rate of the particles, in a case where the particle is spherical, the filling density is in a range of 55% to 74%, and even if the filling density is low in the initial stage, the particles are filled at the maximum density by fluidization or vibration. In addition, in a silica gel or a resin-based particulate adsorbent, swelling occurs due to moisture absorption or water absorption to cause a change in volume. Therefore, there is also a problem that in a case of dense filling, the adsorbent particles are broken without escaping from swelling. In the methods disclosed in Patent Documents 6, 7, 8, 9, and 10, an adsorbent body in which adsorbent particles are fixed can be obtained. However, there is no choice but to make the filling density of the particles to be a maximum density, and in a case where the adsorbent absorbs water and swells, the volume of the entire adsorbent body greatly changes. Patent Documents 8 and 9 disclose a method of forming a permeation path in a group of particulate adsorbents and reducing the pressure loss. However, except for the permeation path, the most dense filling is performed, and thus a problem caused by the most dense filling cannot be solved.

The honeycomb adsorbent body has a low pressure loss even if the contact area is wide, has a light weight but high strength, and thus is advantageous to be easily increased in the size. Therefore, the honeycomb adsorbent is applied to many air processing devices such as those for use in desiccant dehumidification, for use in organic solvent concentration, chemical filters, and ozone filters. The method of producing a laminated honeycomb adsorbent body is largely divided into a method of corrugating paper made from powdered or fibrous adsorbent, or a sheet coated with a powdered adsorbent, and forming a honeycomb by laminating or winding, and an impregnation coating method of corrugating a base material sheet not containing an adsorbent (absorbent), forming a honeycomb by laminating or winding, and immersing, pulling up, and drying thereof in a slurry in which the adsorbent (absorbent) powders and a binder are mixed.

In both of a corrugate processing method of an adsorbent-containing sheet and a method of impregnation-supporting an adsorbent onto a corrugate laminate, a binder is necessarily required to hold a powdered adsorbent, the binder inhibits adsorption performance, and in a case where the amount of the binder is small, there is a risk that the adsorbent powder may fall off.

In addition, in a processing method of preparing a laminated honeycomb adsorbent body after corrugating mixed paper or a coating sheet of a particulate adsorbent, the sheet is required to have a strength that can withstand corrugating processing, and there are possible range and limitation in the thickness of the sheet material and the number of processable cells. The content of the adsorbent is in conflict with the corrugating processability, and this makes it difficult to achieve high performance. In addition, in order to increase the number of cells to achieve high performance, it is required to reduce the thickness of the sheet, and the thinning further increases the level of difficulty in paper-making and corrugation, which leads to an increase in the cost.

In a method of impregnating and coating an adsorbent slurry with a corrugated honeycomb base material, the impregnation becomes difficult due to clogging, there is a reciprocal relationship between the increase in the number of cells and a high support rate, and thus there is a limit in increasing the density of the adsorbent. In a mixed paper corrugation method or a coating sheet corrugation method, the limit is about 30% by weight. There are some examples in which the support rate by the impregnation method is 40% to 50% by weight, but are often seen since the specific gravity of the adsorbent or the inorganic binder is as high as about 2 to 3. It is considered that the maximum volume ratio of the adsorbent per adsorbent body volume after subtracting the base material or the binder is limited to about 25 Vol %.

The inventor's proposal relates to a gas adsorbent body that recovers carbon dioxide gas at a high recovery rate by a wet thermal swing method using an adsorption promoting effect due to desorption by condensation heat of water vapor and evaporative cooling of condensed water, can be concentrated to a high concentration, has high durability, has relatively small pressure loss, can be reduced in size, can be produced at a relatively low cost, a method for producing thereof, and a carbon dioxide concentration device.

The proposed adsorbent body is produced by adhering and fixing a particulate adsorbent onto a single surface or both surfaces of a sheet, and laminating the sheet. Since the particulate adsorbent is fixed to the sheet, while using the particulate adsorbent, there is no breakage or abrasion of particles due to contact, collision, and friction between the particulate adsorbents, which is an disadvantage of the filling tower method, the fluidized bed method, and the moving bed method, and there is no most dense filling structure. Therefore, even if water vapor and the like are adsorbed, the particulate adsorbent swells or expands, and thus it is possible to prevent problems such as deformation and damage. In addition, since the particle density can be optionally prepared, the particle density can be optimized depending on the use, the kind of the adsorbent, and the use method, and the optimal design in consideration of the gas flow between particles is possible.

As the shape of the particulate adsorbent, a spherical shape having a uniform particle diameter is desirable, but even if the particle diameter is not uniform, a crushed shape, a columnar shape, or the like can be applied to the proposed adsorbent body. The kind of the adsorbent is not limited as long as it is a solid adsorbent such as active carbon, silica gel, active alumina, ion exchange resin, and solid amine. In a case where the particle diameter is large, the macro contact area with the processing gas flow is reduced, and the absorption/desorption speed is reduced due to diffusion resistance of the gas in the particles. Therefore, with the advantage from the adsorbent particles fixed onto the sheet, a particle diameter of 3 mm or less is possible, a particle diameter of 2 mm or less is preferable, and a particle diameter of 1 mm or less is more preferable, in order to improve performance. In addition, since large-diameter particles also have disadvantages of change in volume due to moisture absorption/desorption, or easy breakage due to heat shock, the problem cannot be solved by employing small-diameter particles.

In a case where fine particles of 1 mm or less are employed for high performance of the device, in the filled layer of the related art, the pressure loss becomes extremely high, and various problems due to fluidization and flow of particles due to the gas flow occur. However, in the proposed method, since fine particles are fixed and the filling density can be freely set, the pressure loss is adjusted, damage and powdering of particles do not occur, and even if the particles are partially damaged, the particle interval can be more sparsely set than the most dense filling. Therefore, there is a feature that problems such as blocking of an adsorption particle layer due to debris do not occur. Fine particles refer to adsorbent particles of which particle diameter is controlled intentionally, and production of a fine particle adsorbent of 0.1 mm or less can be possible by an emulsion method and the like. However, if an adsorbent having a particle diameter equivalent or more, desirably two times or more the thickness of the sheet to be adhered is not selected, the filling density does not become high.

In the proposed method, the adsorbent particles are two-dimensionally adhered and fixed to a single surface or both surfaces of the sheet, are not affected by the maximum density due to gravity, compared to an adsorption layer three-dimensionally filled with the particulate adsorbent, and there is small contact between the adsorbent as shown in the photograph on the left side of FIG. 3. Since the particles are fixed, a disadvantage that there occurs a problem in a layer (bed) filled with a particulate adsorbent, fluidization, crushing, pulverization, blocking of the most dense portion, blow-through of the less dense portion, and the like are resolved.

In a case of three-dimensionally filling particles, the density is experimentally about 55 Vol % in the most sparse case, but 74 Vol % of the most dense filling ($\pi/\sqrt{18}=0.74048$) due to gravity, and vibration and flow movement of the particles is inevitable. The above theory is applied to a case where a particle diameter is uniform, and in a case where the particle diameter is not uniform, the filling density becomes further higher.

In the proposed method, gravity of the particles at the time of adhering and fixing is applied only in the direction of the sheet surface. Therefore, there is no tendency for the most dense filling in a two-dimensional array, and the filling rate is experimentally about 40 Vol % unless otherwise intended. The particle adhesive sheet and the laminate adsorbent body have features of little contact between the particles, and of being adhered and fixed apart from each other in most cases, as shown in the left diagram of FIG. 3. In addition, the method has an effect in which since there is little contact between the particles, the gas flow smoothly passes between the particles and the contact efficiency is improved, and an effect in which even if the particles expand due to moisture absorption, water absorption, and the like, damage or clogging of the particles due to the expansion is avoided.

With aspects of the inventor's proposal, since particulate adsorbent particles are used in a state where the particulate adsorbent produced (in a state where the particulate adsorbent is produced as it is) or in a state of coarsely crushed, there is no labor of finely pulverizing as in the case of being supported on a honeycomb, adsorption performance is not reduced by covering fine particulate adsorbent by a binder, and the fine particulate adsorbent is not separated and scattered. Steps such as fine pulverization, corrugating, coating or impregnation drying can be reduced, and the cost can be reduced.

In addition, in an adsorption device comprising a fixed bed, a fluidized bed, and a moving bed of a particulate adsorbent filled layer in the related art, there is a problem of abrasion, crushing, and powdering due to fluidization or contact of the particles, or a problem of high pressure loss and unevenness or change in density. However, the aspects of the inventor's proposal relate to a method of adhering and fixing a particulate adsorbent onto a single surface or both surfaces of a sheet, and laminating or winding the sheet to form an adsorbent body, and thus there is no particle fluidization, and thereby crushing, powdering and scattering, and deviation of particles do not occur. Since a dense filling portion does not occur due to the influence of the gravity of the particles in terms of the production, the contact portion between the particles is extremely small, and can be diffused and fixed as shown in the left diagram of FIG. 3. In addition, it is possible to optionally set the filling density in a stage of adhering particles on a sheet, and it is possible to control a particle array or set an air duct or a wind duct in the particle array. Therefore, there is also a feature that it is possible to prepare an optimal adsorbent body in a targeted adsorption device.

In a layer (bed) filled with a three-dimensionally particulate adsorbent, from the most dense filling theory of spheres, in one particle, there are maximum 12 contact points between particles, capillary tubes are formed around the contact points, in the contact points, condensed water is drawn by capillary force as shown in the left diagram of FIG. 6, coarse density of the condensed water is formed on a particle surface, and this has an adverse effect on the simultaneous proceeding phenomena of carbon dioxide adsorption in the adsorption step and the evaporative cooling phenomenon of water. In other words, in a portion where the condensed water is coarse, vaporized cooling water is interrupted on the way, and in a portion where the condensed water in the contact portion with the particles is dense, the start of adsorption is delayed due to the water film thickly covering the surface.

In the proposed adsorbent body, as shown in the right diagram of FIG. 6, since the particulate adsorbent is distributed and adhered to the sheet surface with a small number of contacts, the water film is mainly drawn to the contact points with the sheet, as shown in the right diagram of FIG. 6, and does not inhibit the adsorption of carbon dioxide gas. In addition, even if condensed water is unevenly distributed, heat conduction of the entire adsorbent body is promoted by heat conduction of the sheet. That is, the evaporative cooling effect is complemented and improved throughout the inside of the adsorbent body, and as a result, the adsorption performance of the entire adsorbent body is also improved.

BRIEF DESCRIPTION OF THE DRAWINGS

These and/or the other aspects and advantages will become apparent and more readily appreciated from the following description of the embodiments, taken in conjunction with the accompanying drawings.

DETAILED DESCRIPTION OF THE PREFERRED EMBODIMENTS

Figure 1:
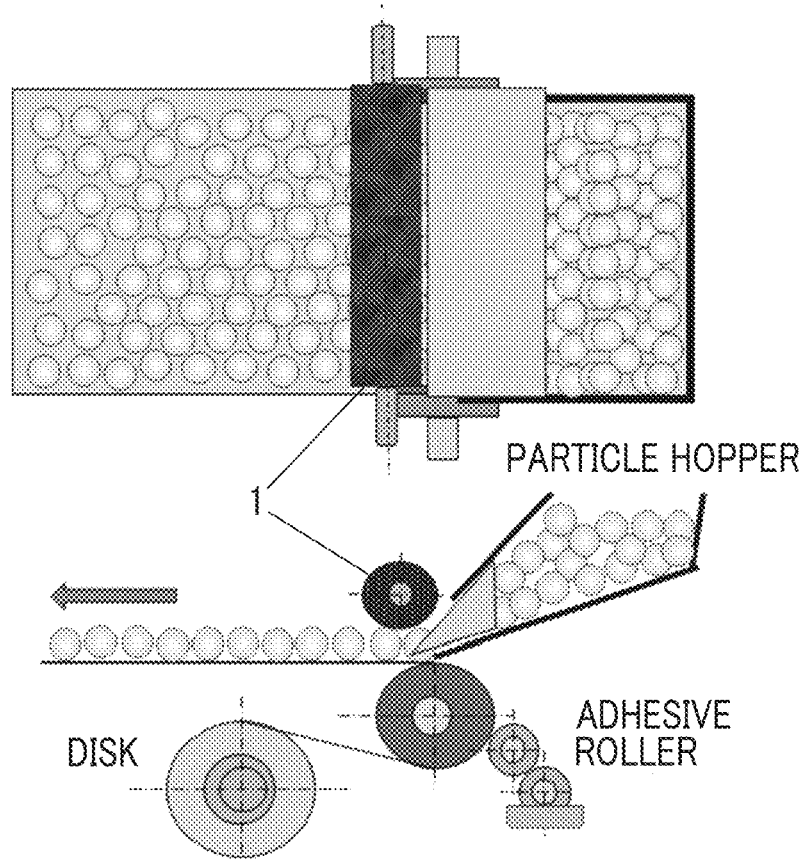
FIG. 1 is an image diagram of a device for continuously adhering and fixing adsorbent particles onto a single surface of a sheet.

Reference will now be made in detail to the embodiments, examples of which are illustrated in the accompanying drawings, wherein like reference numerals refer to the like elements throughout. The embodiments are described below to explain the present invention by referring to the figures.

The inventor proposes a laminate adsorbent body obtained by adhering and fixing a non-powdered, particulate, desirably spherical solid adsorbent onto a single surface or both surfaces of a sheet which impermeable or becomes impermeable by application of an adhesive, such as a metal sheet or plastic sheet, an inorganic fiber sheet, and a heat-resistant fiber non-woven fabric, and laminating or winding the sheet a plurality of times. The laminate adsorbent body is formed of a disk-type or cylindrical-type rotor to prepare a rotor type adsorption concentration device. Since it is a rotor type, the adsorbent body moves to a next step by rotation of the rotor, and thus the structure is simple. Therefore, there is an advantage that switching control is easy, and an increase in size is easy.

Figure 2:
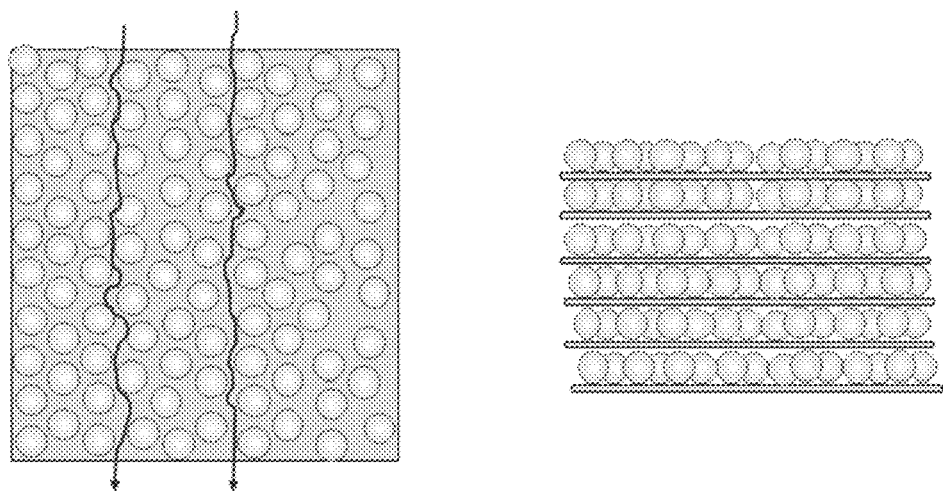
In FIG. 2, the left diagram shows a sheet in which a particulate adsorbent is adhered and fixed onto a single surface of a sheet, and the right diagram is a diagram of an adsorption block in which the sheet is laminated.

FIG. 1 shows an adsorbent particle adhesion device of an example. After applying a water-resistant acrylic emulsion adhesive onto a single surface of a 25μ of aluminum sheet with an adhesive roller, while supplying an amine-based weak base anion exchange resin having a particle diameter of 0.3 to 1.2 mm from a particle hopper, the resin is pressed with a pressing roller 1, and particles are adhered and dried onto the aluminum sheet to obtain an adsorption sheet in which an ion exchange resin particle of 280 g/m2 is adhered and fixed onto a single surface of the left diagram of FIG. 2. The adsorption sheet is cut into a predetermined size and laminated to obtain a laminate adsorbent body of the right diagram of FIG. 2.

Figure 4:
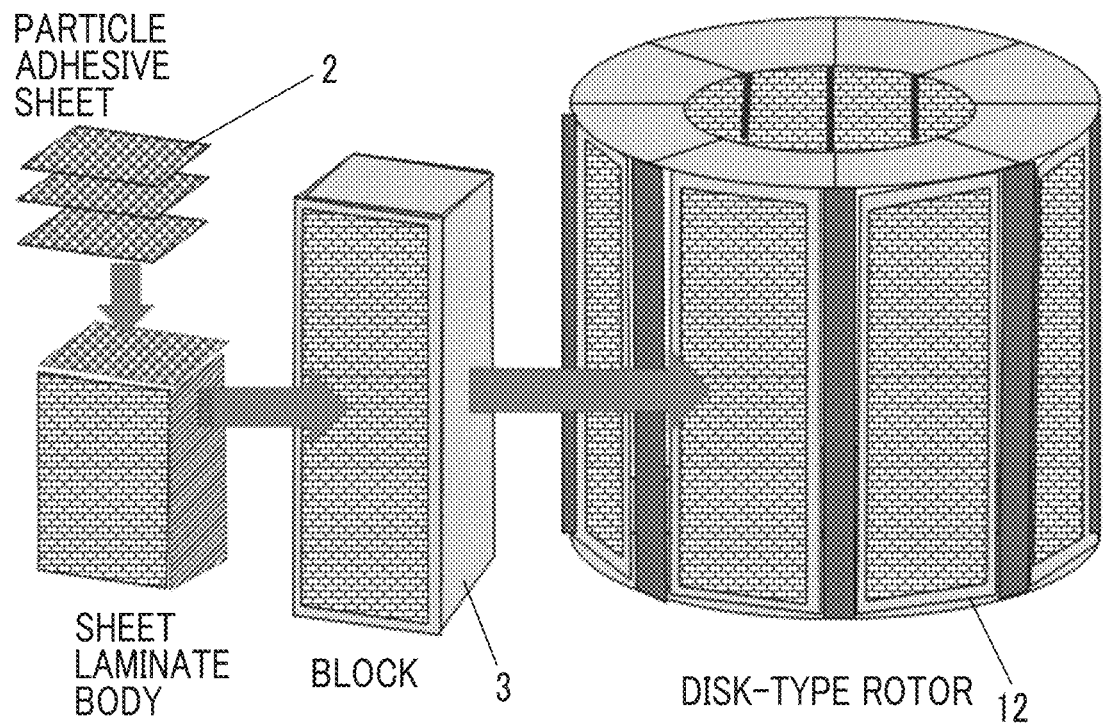
FIG. 4 shows an embodiment of a cylinder type adsorption rotor (right diagram) in which a block (middle diagram) in which an adsorbent particle adhesive sheet (left diagram) is laminated and accommodated is assembled in a cylindrical shape.

From FIG. 4 (left diagram), an adsorbent particle adhesive sheet 2 is placed in a casing while being laminated to obtain a block diagram 4 (middle diagram). In addition, the block 3 is mounted on a cylindrical rotor frame to obtain a cylindrical rotor 12 shown in FIG. 4 (right diagram).

Figure 5:
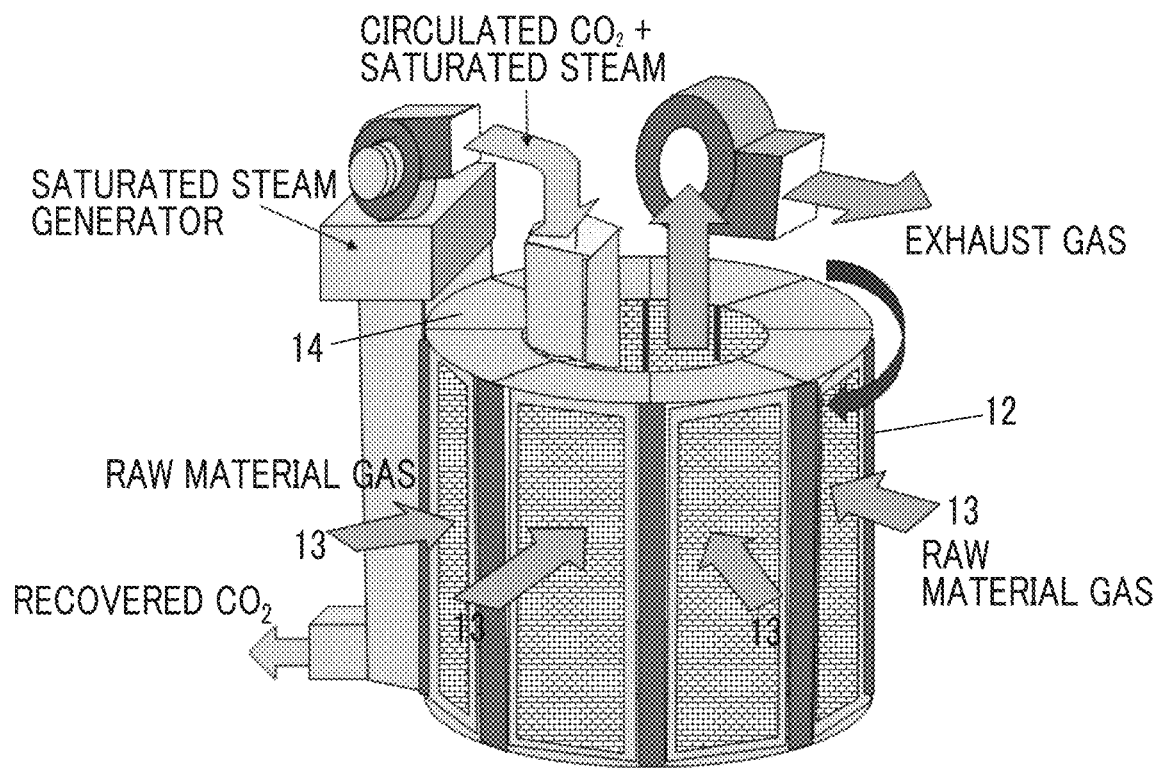
FIG. 5 shows an embodiment of a cylindrical rotor rotary carbon dioxide gas concentration device using a cylinder type adsorption rotor.
Figure 6:
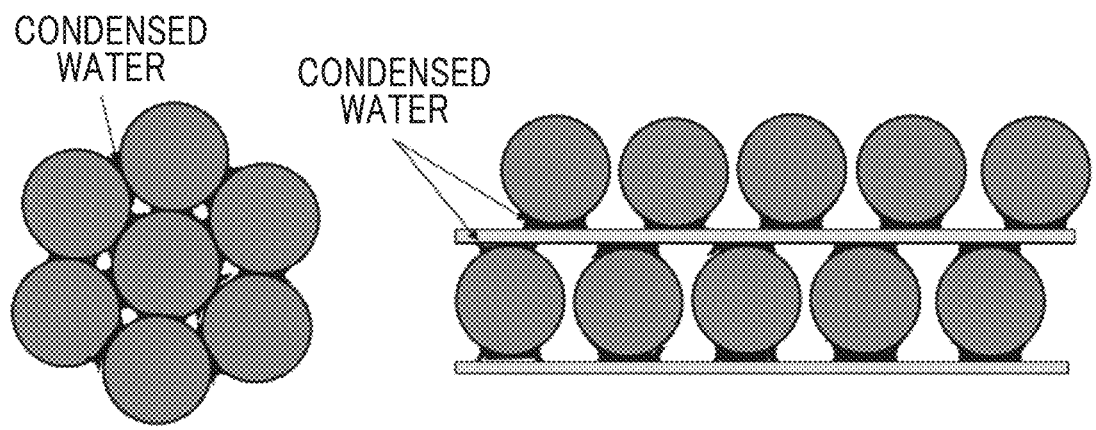
FIG. 6 is a comparative explanatory diagram having an advantage in application to a wet carbon dioxide gas concentration method. The left diagram shows a filled layer in the related art, and the right diagram shows a particulate adsorbent adhesive sheet laminate of the inventor's proposal.

FIG. 5 shows a flow of a carbon dioxide recovery and concentration device equipped with the cylindrical rotor 12. An adsorption zone 13 and a desorption zone 14 are provided, and the adsorbent body cylindrical rotor 12 is configured to return from the adsorption zone 13 to the adsorption zone 13 via the desorption zone 14.

In a case where exhaust gas discharged from a power plant or the like is subjected to denitration, desulfurization, and dedusting processing in an outer peripheral side adsorption zone 13 of a cylinder, and further cooled and dehumidified to a temperature at which adsorption is possible and introduced as a raw material gas, carbon dioxide gas is adsorbed in a weak base ion exchange resin supported on an adsorbent body, and the raw material gas having a reduced carbon dioxide concentration flows out to an inner peripheral side of the cylinder and is exhausted.

In a case of adsorbing carbon dioxide, adsorption heat is generated, according to a method in the related art, carbon dioxide adsorption ability is decreased due to an increase of the gas temperature, and a recovery concentration in one pass in a case where a processing inlet concentration is about 10% is only 2%. However, since an adsorbent body in an adsorption step of the rotor 12 is wet with condensed water in a desorption step for the reason to be described later, condensed water is evaporated due to passage of the raw material gas having a dew point temperature of about 10° C. to 25° C. D.P., an vaporizing cooling phenomenon occurs, temperature rise is suppressed, and therefor adsorption performance in one pass is dramatically improved. That is, adsorption and vaporization of carbon dioxide and evaporative cooling of water proceed simultaneously.

Latent heat of evaporation of water is 2,500 kJ/kg·K, which is latent heat of six times or more the latent heat of vaporization of carbon dioxide of 369.9 kJ/kg·K, and the adsorption heat is converted into the vaporization heat of water and can be effectively removed. Therefore, adsorption performance is not decreased by the adsorption heat, a sufficient recovery rate is obtained by passage of the raw material gas 1 pass, and thereby it is possible to reduce a size of a device, and to reduce gravity of a blower, that is, energy saving properties at the same time.

The adsorption block that has absorbed carbon dioxide moves to the desorption zone 14 by rotation of the rotor. In the desorption zone 14, a mixed gas of carbon dioxide gas and steam circulating in the desorption zone, so-called saturated steam, is transferred from an inner peripheral side to an outer peripheral side of the cylinder, and is introduced to the adsorbent body. The adsorbent body is heated by condensation of saturated steam, and the saturated steam is condensed on a surface of the adsorbent body. At the same time, the carbon dioxide gas adsorbed on the particulate amine-based ion exchange resin of the adsorbent body is desorbed, and excessive carbon dioxide gas is recovered from a regeneration circulation path. That is, the condensation heating of saturated steam and desorption cooling of carbon dioxide proceed simultaneously. The adsorbent body in which desorption has been completed returns to the adsorption zone 13 again, and carbon dioxide can be continuously recovered and concentrated.

In the adsorbent particle adhesion device of FIG. 1, while applying a water-resistant acrylic emulsion adhesive to a single surface of a 50 μPET resin film with an adhesive roller, there is obtained a sheet in which a particulate silica gel of 0.8 to 1.7 mm obtained by loading an amine compound, for example, aminosilane, is distributed and adhered from a particle hopper. The silica gel adhesion weight was 896 g/m2. The adsorption sheet is cut and laminated to a predetermined size to obtain a laminated adsorbent body shown in the right diagram of FIG. 3. The support amount of silica gel was 590 kg/m3. Since a layer filled with the silica gel particles is 765 kg/m3, it is distributed at a sparse density of about two thirds.

Figure 3:
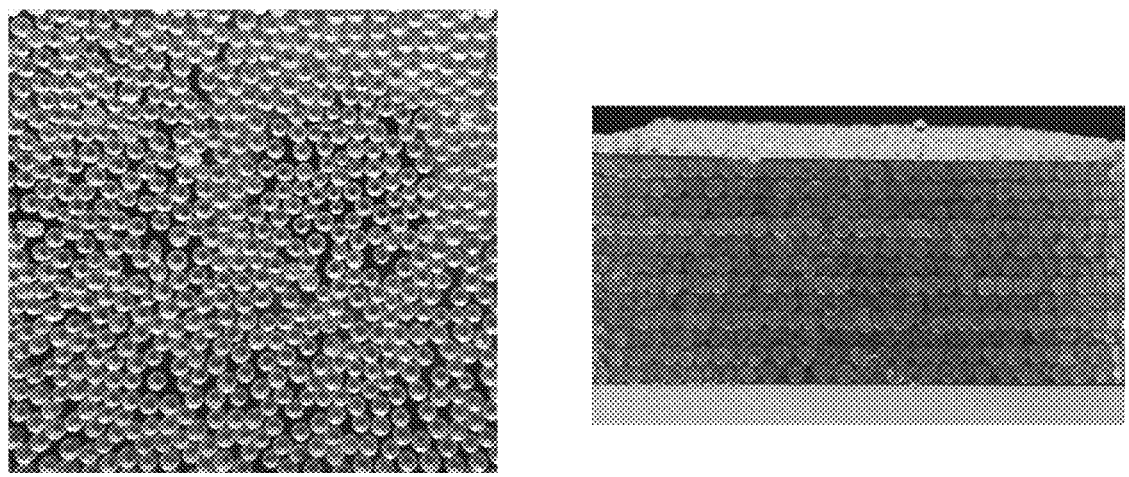
In FIG. 3, the left diagram is a photograph of the surface of the particulate adsorbent adhesive sheet, and the right diagram is a photograph of the laminate adsorbent body.

FIG. 3 shows a photograph of a surface of the adsorption sheet. The adsorbent particles have few contact points, are not densely filled by two-dimensional filling, and have a marginal distribution. According to the proposed method, it is difficult to achieve dense filling by two-dimensional filling, and conversely, an effect of easily obtaining a sparse distribution that cannot be obtained by a filled layer is remarkable and characteristic. In addition, the pressure loss was 50 mm in layer height (rotor width), 30° C. (hereinafter, all temperatures are "Celsius"), and the front wind speed was 1 m/s. The adsorbent body of the present example is reduced to about two thirds of 330 Pa with respect to 445 Pa of the particulate silica gel-filled layer. The pressure loss of 330 Pa corresponds to a 600 mm width of a 220-cell honeycomb. In the case of a large rotor, a rotor width of 50 mm is not realistic in order to ensure structural strength, but in the proposed device, the layer height and the pressure can be freely set, and it is possible to freely design a concentration device by controlling the particle distribution.

The sheet to which an aminosilane-loaded spherical silica gel is adhered and fixed is cut into 200×200 mm, and laminated and accommodated in a casing to obtain an adsorbent body block 3 of FIG. 4. Although an unprocessed spherical silica gel adhesive fixing sheet is made into a sheet shape or laminated, and then immersed and supported in an amine compound-loading solution, the same effect is obtained. In addition, an adsorbent body block is set in a cylindrical frame, and is assembled to a cylindrical adsorbent body rotor 12 as shown in the right diagram of FIG. 4. Hereinafter, carbon dioxide gas is concentrated based on the same principle as in Example 1.

Figure 7:
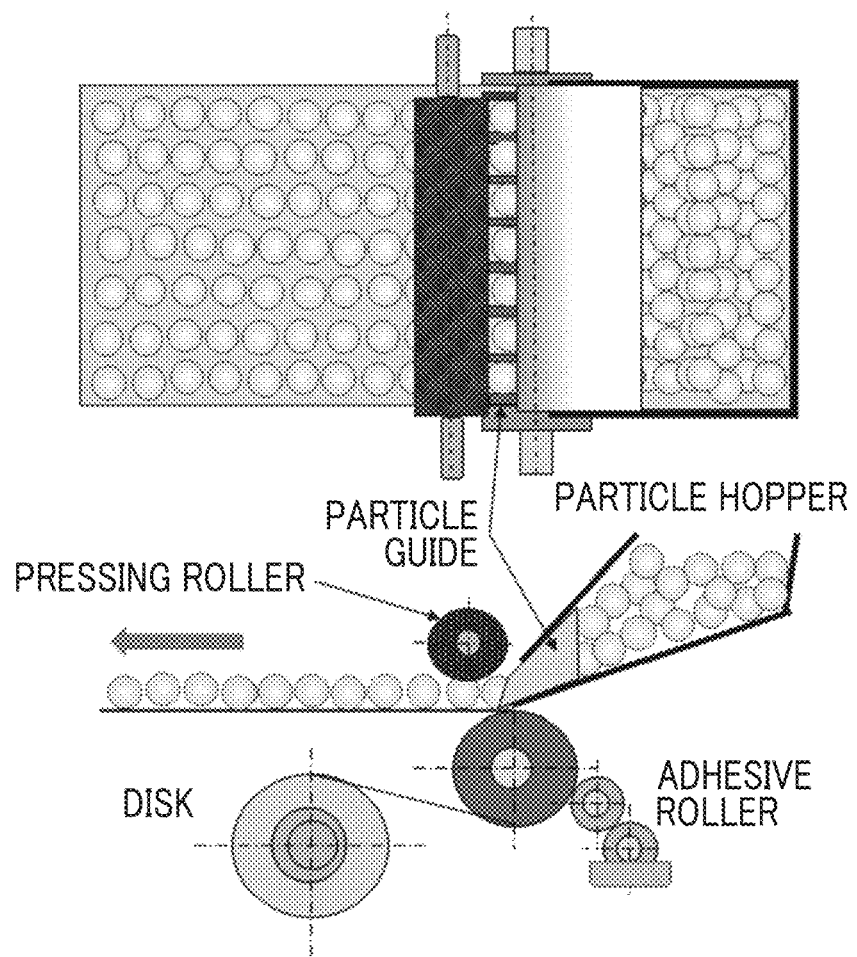
FIG. 7 shows an example of a production method of a particle adhesive sheet in which particles are aligned in a longitudinal direction. This can be realized by providing a particle alignment guide at an interval per one maximum particle diameter in a particle adhesion device.
Figure 8:
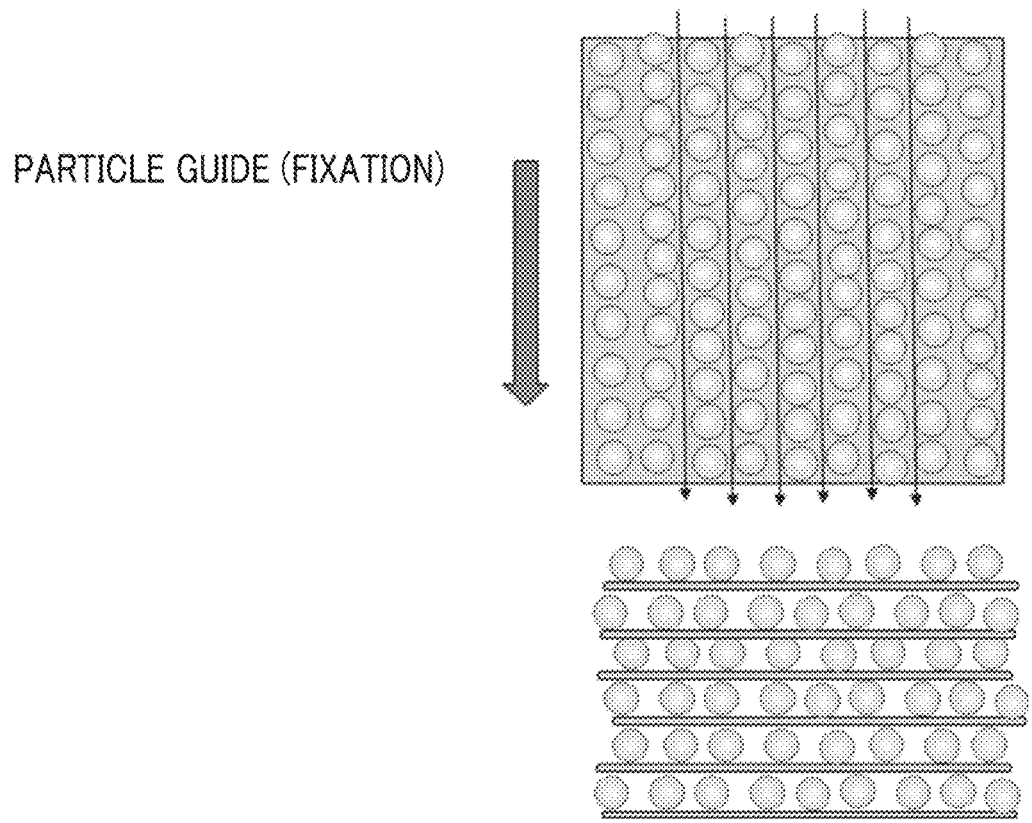
FIG. 8 shows a section of a gas flow (upper diagram) and a laminate (lower diagram) in a particle adhesive sheet in which particles are aligned in a longitudinal direction.

As an application example of the device of FIG. 1, FIG. 7 shows an example of a device in which adsorbent particles are aligned and adhered onto a sheet. By providing a plurality of particle guides (alignment fins) having a width that allows adsorbent particles having a maximum diameter to pass therethrough at positions where the adsorbent particles are supplied onto the sheet coated with an adhesive from the hopper, a gas introduction path penetrating beyond the width of the fin as shown in FIG. 8 (upper diagram) is formed between rows of the particles. The cylindrical rotor in which the gas introduction path is laminated and configured in a direction along the gas flow has an effect of reducing the pressure loss and an effect of controlling the gas drift in a lateral direction.

Figure 9:
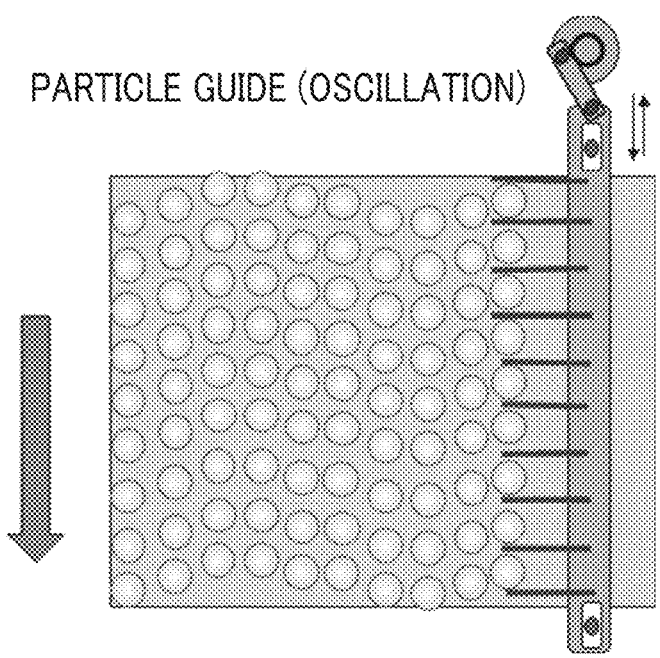
FIG. 9 shows an example of a production method of a particle adhesive sheet in which particles are aligned in a serpentine manner in a longitudinal direction. Similar to FIG. 7, in the device, it is possible to prepare a particle adhesive sheet by performing particle adhesion while swinging the particle alignment guide.
Figure 10:
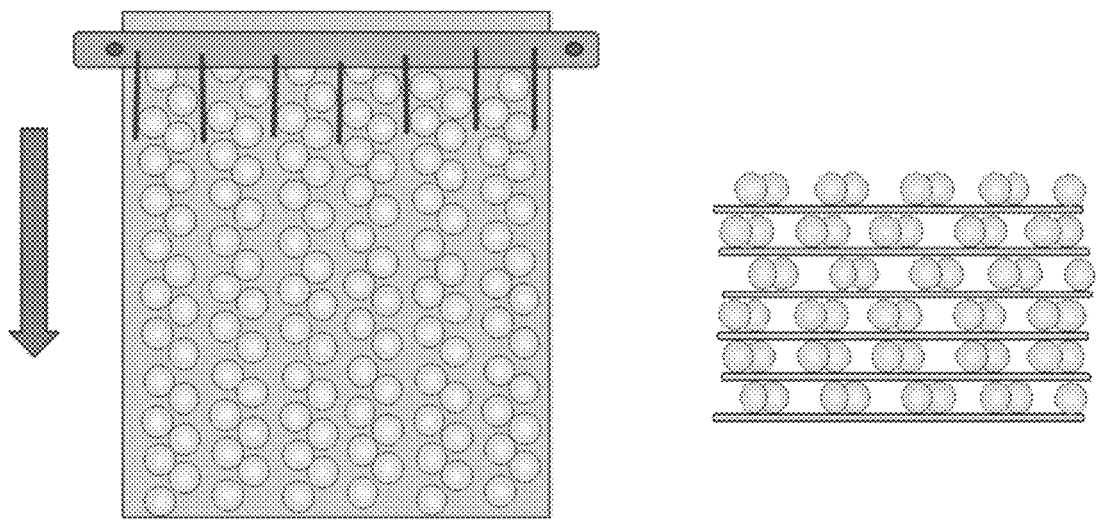
FIG. 10 shows an example of a production method of a particle adhesive sheet in which particles are in a staggered arrangement, the sheet (left diagram), and the laminate (right diagram). It is possible to prepare a particle adhesive sheet by providing a particle alignment guide at an interval per about 1.5 of particle diameter in a particle adhesion device.

In a case where the particle guides (alignment fins) are swung by the device of FIG. 7, the rows of the particulate adsorbents can be adhered and fixed in a serpentine manner as shown in FIG. 9, and there is an effect of increasing a high contact efficiency between the gas flow and the adsorbent particles. In addition, in a case where the width of the adsorbent particle alignment fins is adjusted to 1.5 times the maximum diameter of the particles, it is possible to prepare a sheet in which the adsorbent particles are adhered and fixed in a staggered arrangement as shown in FIG. 10 (left diagram). One of the inventor's proposals involves preparing a laminate adsorbent body in which a filling density or a gas flow path of adsorbent particles are controlled as described above.

Figure 11:
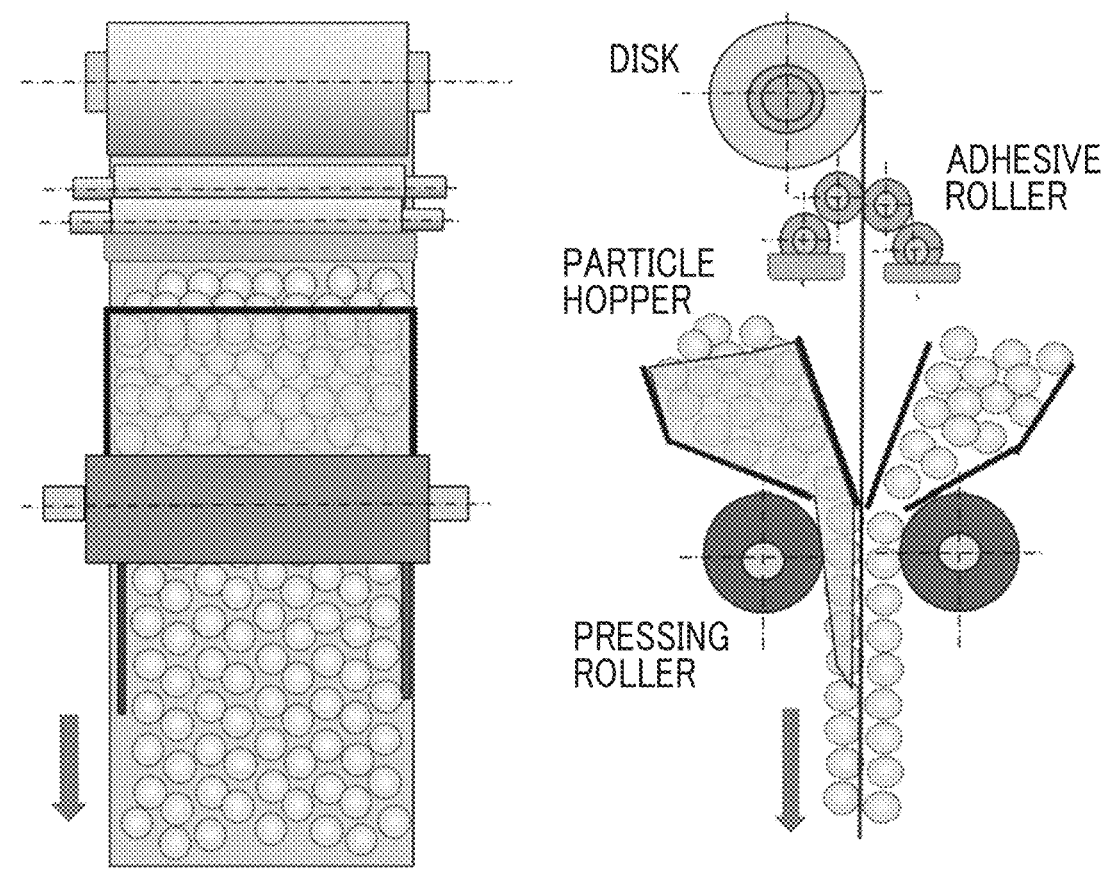
FIG. 11 shows an example of a production method of a both surface particle adhesive sheet of adhering adsorbent particles simultaneously onto both surface of a sheet.
Figure 12:
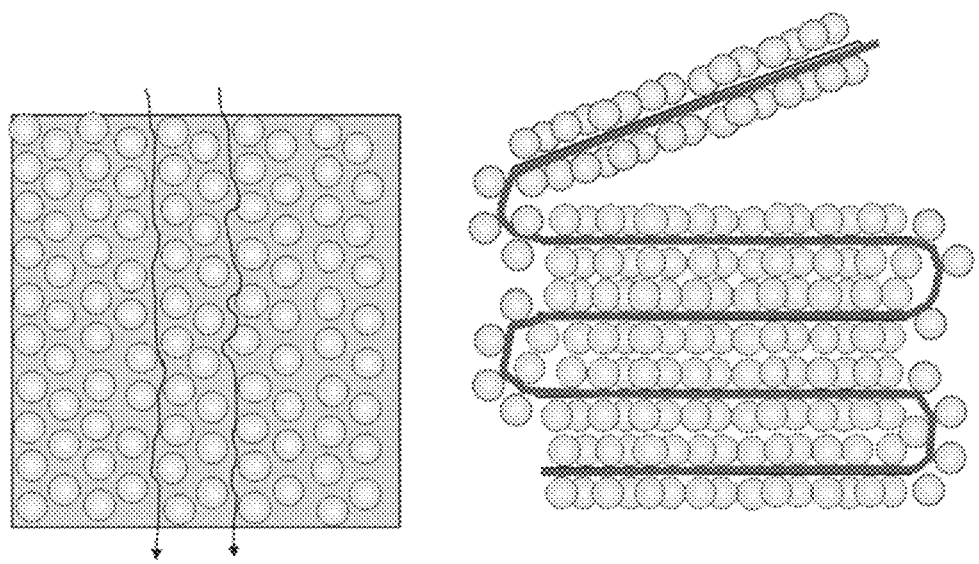
FIG. 12 shows an example of a production method of a sheet (left diagram) prepared by a method of adhering adsorbent particles simultaneously onto both surface of a sheet, and a block (right diagram) in which a sheet is folded and laminated without being cut.

FIG. 11 shows a device of preparing a sheet in which adsorbent particles are adhered onto both of front and back surfaces. The particles in the hopper are affected by gravity, but are controlled to a two-dimensional array at a time of adhering to the sheet, and by being instantaneously adhered, there is no need to proceed to dense filling in a two-dimensional array. Therefore, a laminate from which a disadvantage in a filled layer is resolved can be realized. In addition, as a feature of a particle double-side adhesive sheet, a laminate can be folded back without cutting the sheet as shown in FIG. 12 (right diagram), and it is possible to design a low-cost laminate adsorbent body having a small sheet area configured as a laminate. Hereinafter, the carbon dioxide gas is concentrated based on the same principle as in Example 1.

Figure 13:
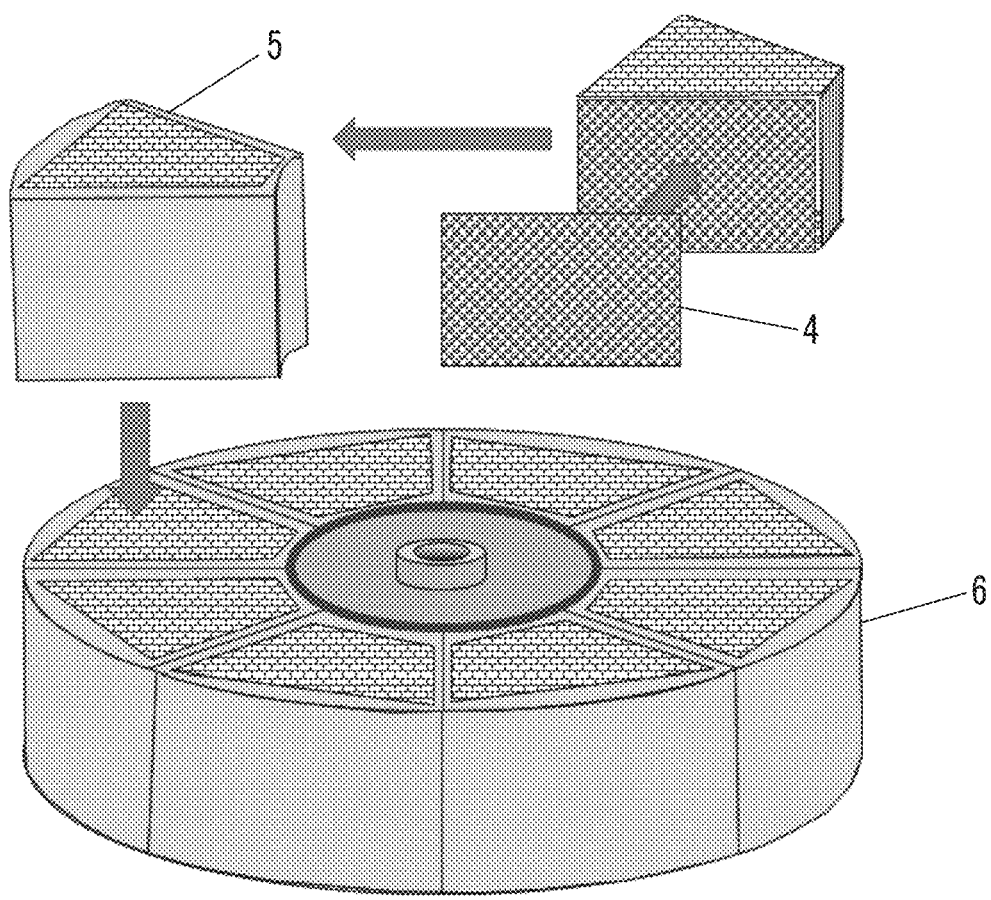
FIG. 13 shows an example of an adsorption concentration rotor in which a fan-shaped casing in which an adsorbent particle adhesive sheet is laminated and accommodated is assembled in a disk-type rotor.

FIG. 13 shows an example of a disk-type rotor. An adsorbent adhesive sheet 4 is laminated and mounted on a fan-shaped frame to obtain a fan-shaped laminate adsorption block 5. The fan-shaped laminate adsorption block 5 is assembled to obtain a disk-type rotor 6. By performing laminating and mounting in a direction orthogonal to the outer periphery as shown in FIG. 13, the movement of the gas flow inside the adsorbent body in a circumferential direction, that is, in a longitudinal direction of the rotation, can be limited, and mixing of the processing gas and the desorption gas can be prevented.

Figure 14:
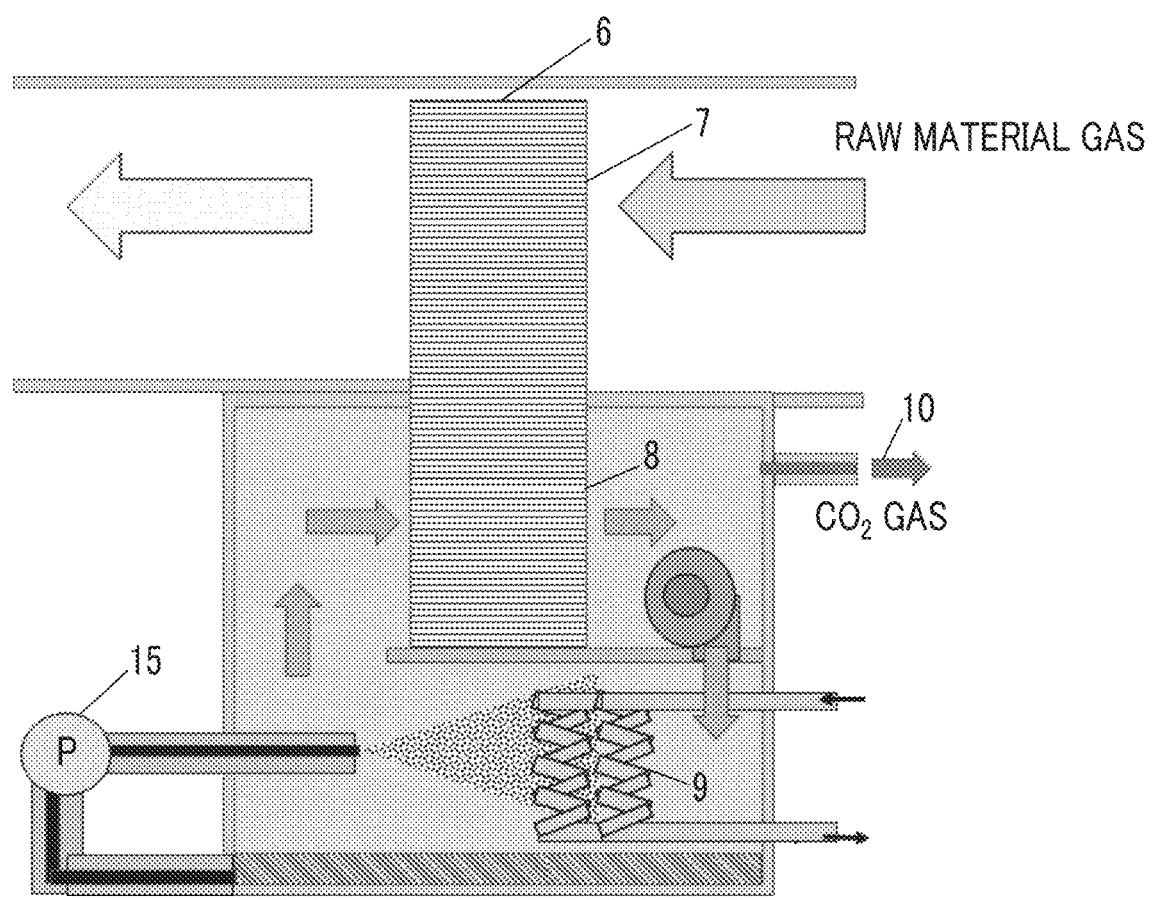
FIG. 14 shows a diagram of a carbon dioxide gas concentration device in which a disk-type rotor is assembled.

FIG. 14 shows a principle of a disk-type rotor carbon dioxide recovery and concentration device. The disk-type adsorption rotor 6 is installed in a device in which at least the adsorption processing zone 7 for introducing a raw material gas and the desorption zone 8 are separately sealed, and is continuously rotated at a low speed. In a case where exhaust gas discharged from the power plant or the like in the processing zone 7 is subjected to denitrification, desulfurization, and dedusting processing, and the raw material gas cooled and dehumidified to a temperature at which adsorption is possible is introduced into the rotor, the carbon dioxide gas in the gas is adsorbed by adsorbent particles in the laminate adsorbent body. Although adsorption heat is generated during carbon dioxide gas adsorption, the adsorbent body becomes wet for the reasons described below. Therefore, moisture evaporates, the adsorption heat is converted into latent heat of evaporation of moisture, and removed, a rise in temperature is suppressed, and thereby adsorption performance of the carbon dioxide gas is dramatically improved. That is, adsorption of carbon dioxide and evaporative cooling of condensed water proceed simultaneously.

In the desorption zone 8, while circulating the carbon dioxide gas, water is supplied to a heat transfer surface of a desorption gas heating heater 9 by a pump 15 and evaporated, a mixed gas of 100° C. or less of carbon dioxide gas and water vapor, that is, saturated steam is generated and introduced into a laminate adsorbent body. The laminate adsorbent body is heated by saturated steam being condensed, and the carbon dioxide gas is desorbed. Saturated steam for desorption has a low temperature of 100° C. or less but has extremely large latent heat of water vapor, thus has sufficient desorption energy as described above. A gas 10 for an increased volume of the carbon dioxide gas desorbed in a desorption circulation path is taken out of a circulation circuit and recovered. The laminate adsorbent body from which the carbon dioxide gas has been desorbed moves to the adsorption processing zone 7 in a wet state by the rotation of the rotor and starts adsorption.

Figure 15:
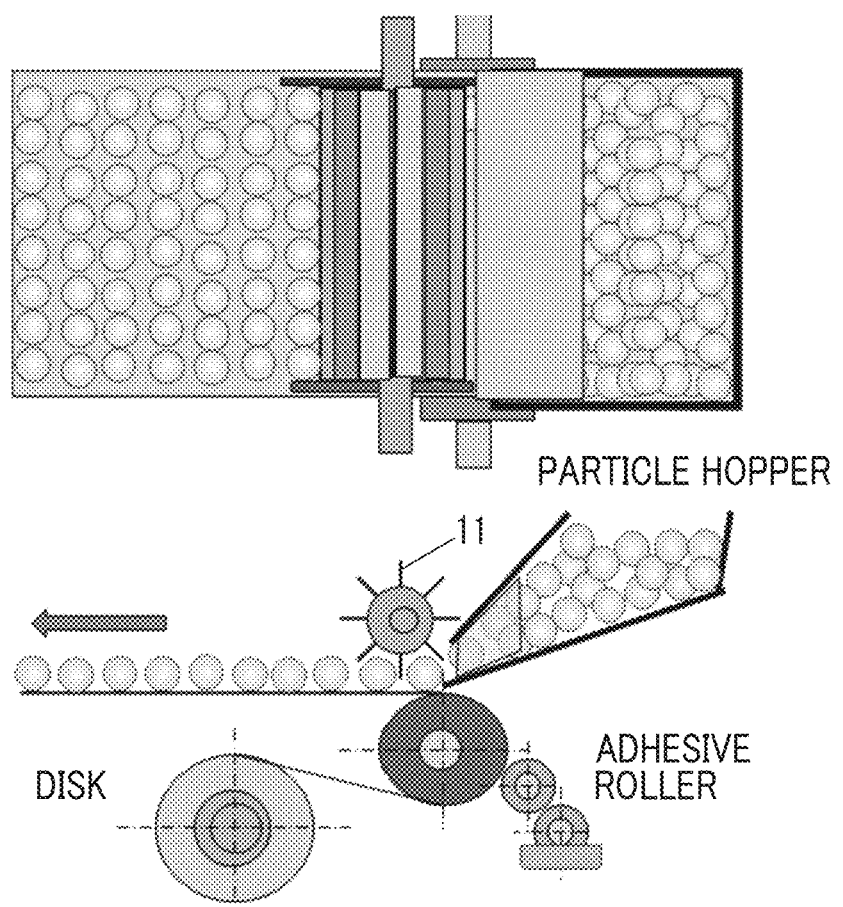
FIG. 15 is an example of an adsorbent body that limits an air flow in a length direction of a long-length sheet, and guides a gas flow in a lateral direction, in which adsorbent particles are aligned in a lateral direction of the sheet by a rotary roller with a partition plate, a wind duct is formed in the lateral direction, and is adhered and fixed.
Figure 17:
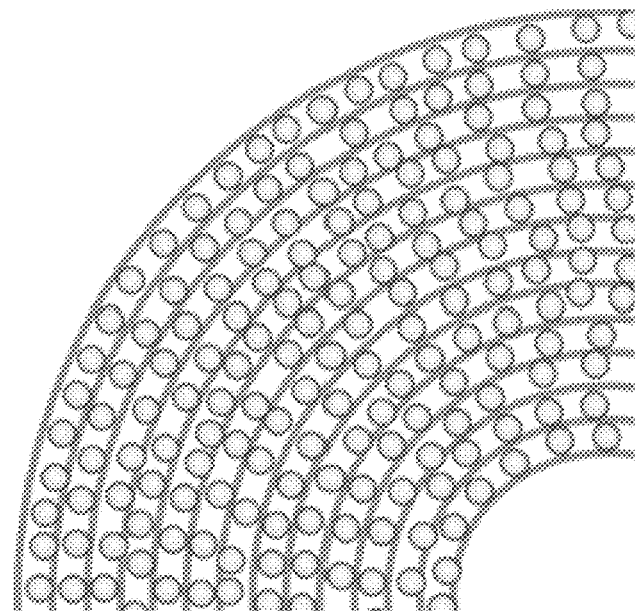
FIG. 17 shows an example of an adsorbent body rotor in which a sheet in which adsorbent particles are arranged so as to guide a gas flow in an axis direction is wound.
Figure 19:
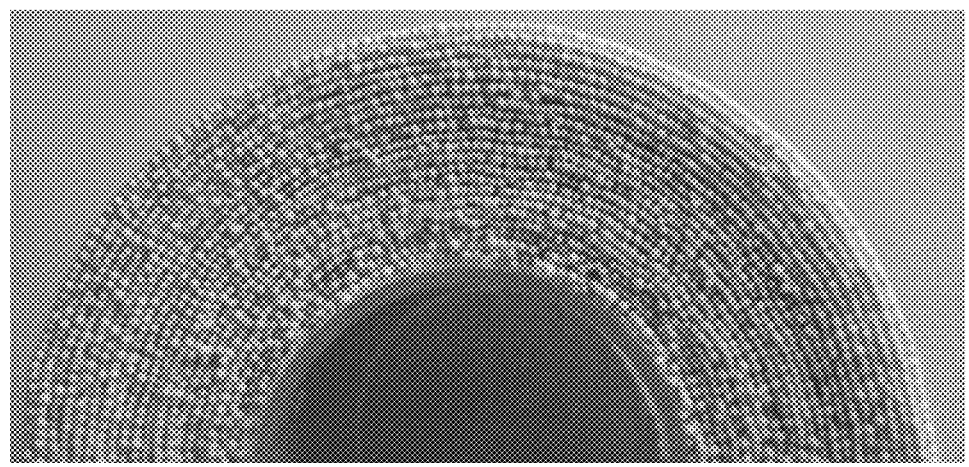
FIG. 19 is a sectional enlarged photograph of a disk-type rotor for winding a particulate adsorbent adhesive sheet.

A photograph shown in FIG. 19 is a trial example of a wound laminate. In a case where winding and laminating is performed by a small rotor for simplification of the structure, leakage to an adjacent zone becomes a problem due to the movement of a gas flow inside the adsorbent body in a circumferential direction. In such a case, it is possible to design a wind duct in an axial direction in a laminate rotor by aligning particles orthogonal to a longitudinal direction of a sheet by the device shown in FIG. 15. In the particle adhesion machine of FIG. 15, before the particles are supplied to the sheet immediately after being coated with the adhesive from the particle hopper, while aligning the particles in the fin 11 disposed at an equal interval in the axial direction in a lateral direction, a particle adhesive sheet in which an introduction path orthogonal to a sheet in a longitudinal direction is prepared. FIG. 17 shows a state of winding and laminating in a rotor shape.

Figure 16:
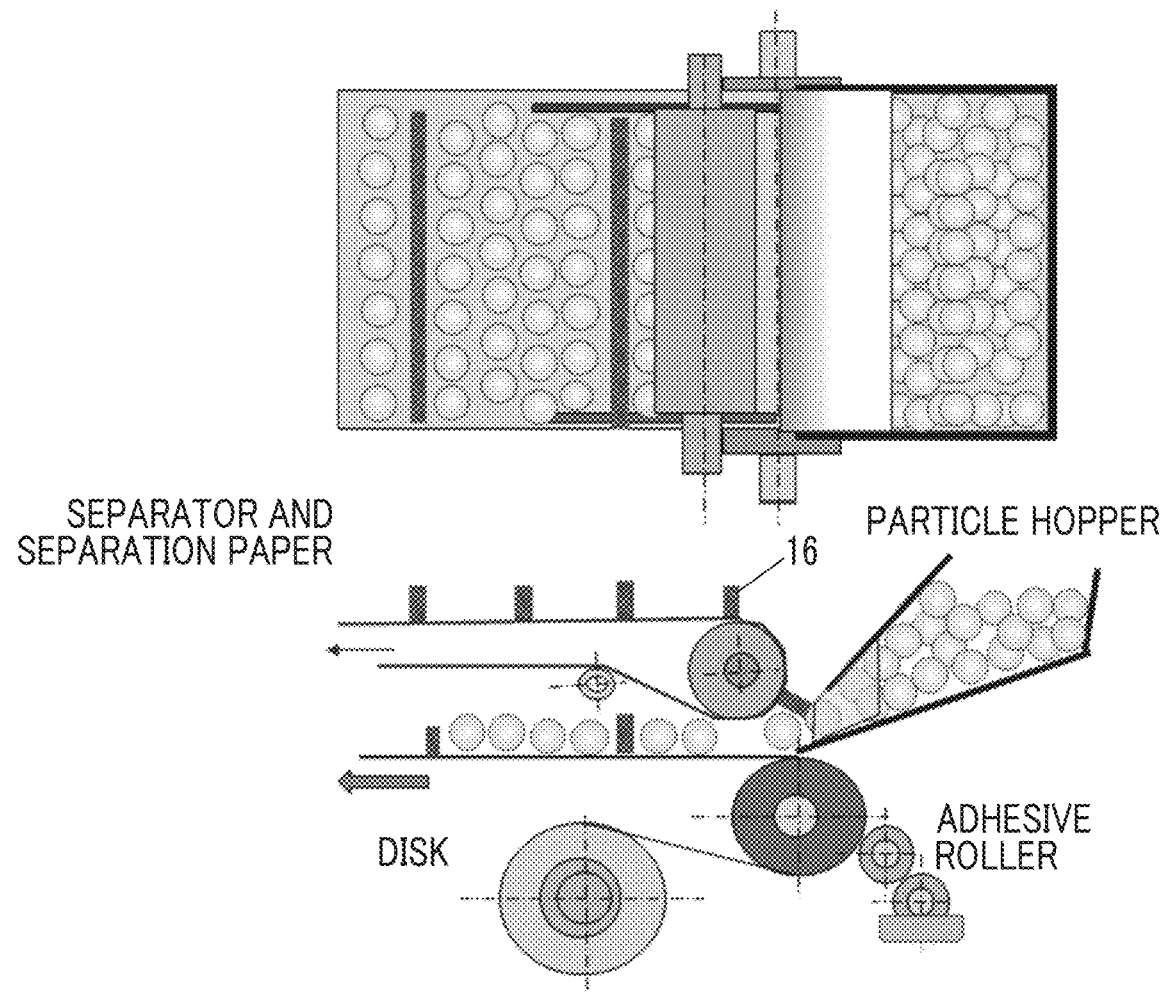
FIG. 16 shows an example of a production method of a particle adhesive sheet that completely limits an air flow in the length direction of a long-length sheet and guides a gas flow in a lateral direction.
Figure 18:
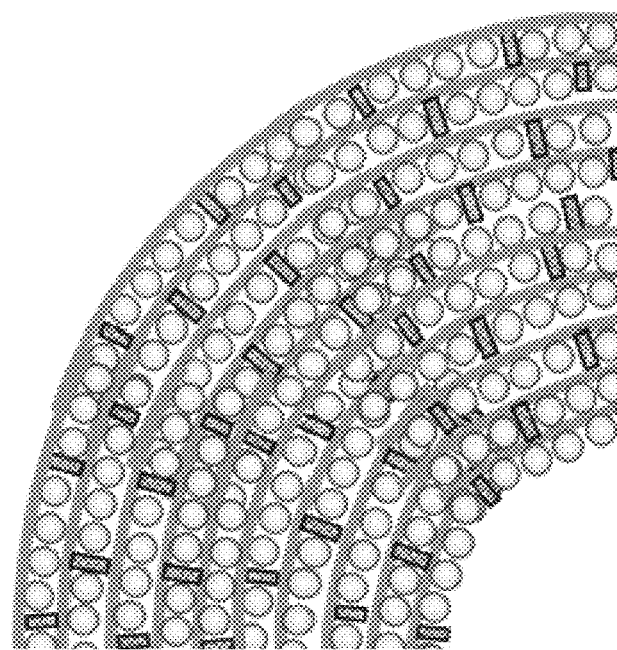
FIG. 18 shows an example of an adsorbent body rotor in which a gas flow is guided in an axis direction and gas leakage is prevented in a lateral direction of the axis.

In addition, FIG. 16 shows a method of adhering adsorbent particles while adhering flexible string-like gaps 16 at an equal interval in a lateral direction as a method of limiting gas movement in the lateral direction. Instead of the string-like gap 16, while extruding a curable caulking material such as silicone in a linear manner, it is possible to prepare a partitioned adsorbent particle adhesive sheet. FIG. 18 shows a state in which the sheet is wound and laminated in a rotor shape. Since the gas movement in the partitioned adsorbent body in a lateral direction is prevented, even with a compact sealing structure, sealing properties are easily ensured. In addition to aminosilane, it is possible to use an adsorbent in which an absorbent such as ionic liquid is loaded in pores. In addition, since the device is of a rotary type, it is possible to provide a pre-cooling-heat recovery purge zone at the boundary between the sorption zone and the desorption zone, and it is possible to provide a purge zone that prevents mixing of a raw material gas into recovery carbon dioxide gas and flow out of the recovered gas to the raw material gas even in a compact device.

Proposed herein is a device of recovering and concentrating carbon dioxide gas from combustion gas discharged from a thermal power plant and the like. The proposals solve disadvantages of a filled layer such as a fixed bed, a moving bed, and a fluidized bed, solves disadvantages of increasing the cost of a honeycomb rotor method, and makes it possible to obtain a gas recovery and concentration device having advantages of both of an adsorption particle filled layer method and the honeycomb rotor method. In addition, the device dramatically increases adsorption performance by a evaporative cooling effect by adsorbing carbon dioxide gas from a wet state of an adsorbent body, and can perform energy saving carbon dioxide gas recovery and concentration using low-temperature exhaust heat of combustion exhaust gas by performing desorption due to circulation of saturated steam mixed with carbon dioxide gas and water vapor.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A carbon dioxide concentration device comprising:
    an adsorbent body formed from sheet material, the sheet material having solid adsorbent particles adhered onto at least a single surface thereof, the adsorbent body being formed by winding the sheet material onto itself or by laminating layers of the sheet material, the adsorbent body being divided into at least into a processing zone and a regeneration zone, to adsorb carbon dioxide in the processing zone and to desorb carbon dioxide in the regeneration zone, the processing zone adsorbing carbon dioxide when the processing zone of the adsorbent body is wet with water and a processing gas is passed through the processing zone, the regeneration zone desorbing carbon dioxide when saturated steam mixed with the carbon dioxide gas and water vapor is passed through the regeneration zone of the adsorbent body so that the saturated steam is condensed and carbon dioxide is desorbed due to condensation heat, wherein
    the solid adsorbent particles are arranged in rows when the solid adsorbent particles are adhered onto at least a single surface of the sheet material, the rows of solid adsorbent particles following a gas flow and forming gas introduction paths between adjacent rows of solid adsorbent particles.

2. The carbon dioxide concentration device according to claim 1, wherein
when forming the adsorbent body by winding the sheet material onto itself or by laminating layers of the sheet material, a layer of adsorbent particles is bounded by two immediately adjacent layers of the sheet material, and
the immediately adjacent layers of the sheet material are generally flat and parallel to one another.

3. The carbon dioxide concentration device according to claim 1, wherein
the adsorbent body is formed without a fluted sheet between adjacent layers of the sheet material.

4. The carbon dioxide concentration device according to claim 1, wherein
the adsorbent body is formed without corrugation.

5. The carbon dioxide concentration device according to claim 1, wherein
after the adsorbent body is formed by winding or by laminating, adsorbent blocks are formed with sections of laminated or wound sheet material, and
a plurality of adsorbent blocks are mounted around a cylindrical rotor frame to form a cylindrical rotor.

6. An adsorbent body comprising:
planar sheet material; and
solid adsorbent particles adhered onto at least a single surface of the planer sheet material, the adsorbent body being formed by winding the planar sheet material onto itself or by laminating layers of the planar sheet material, the planar sheet material being wound or laminated after the solid adsorbent particles have been adhered onto at least a single surface thereof, wherein
the solid adsorbent particles are arranged in rows when the solid adsorbent particles are adhered onto at least a single surface of the planar sheet material, the rows of solid adsorbent particles following a gas flow and forming gas introduction paths between adjacent rows of solid adsorbent particles.

7. The adsorbent body according to claim 6, wherein
within each row, the particles are aligned in a linear or a staggered arrangement.

8. The adsorbent body according to claim 6, wherein
the adsorbent body is formed by laminating layers of the planar sheet material, and
the solid adsorbent particles are arranged in serpentine-shaped rows when the solid adsorbent particles are adhered to at least a single surface of the planar sheet material, the rows of solid adsorbent particles following a gas flow and forming serpentine shaped gas introduction paths between adjacent rows of solid adsorbent particles.

9. The adsorbent body according to claim 6, wherein
the solid adsorbent particles are porous adsorbent particles carrying an amine compound.

10. The adsorbent body according to claim 6, wherein
the solid adsorbent particles are polymer adsorbent particles in which an amine group is incorporated as a fixed ion.

11. The adsorbent body according to claim 6, wherein
the planar sheet material has two surfaces,
the solid adsorbent particles are adhered onto both surfaces of the planer sheet material, and
the planar sheet material having the solid adsorbent particles adhered to both surfaces is laminated while being alternately bent and folded back on itself.

12. The adsorbent body according to claim 7, wherein
the adsorbent body is formed by laminating layers of the planar sheet material, and
the solid adsorbent particles are arranged in serpentine-shaped rows when the solid adsorbent particles are adhered to at least a single surface of the planar sheet material, the rows of solid adsorbent particles following a gas flow and forming serpentine shaped gas introduction paths between adjacent rows of solid adsorbent particles.

13. The adsorbent body according to claim 12, wherein
the solid adsorbent particles are porous adsorbent particles carrying an amine compound.

14. The adsorbent body according to claim 12, wherein
the solid adsorbent particles are polymer adsorbent particles in which an amine group is incorporated as a fixed ion.

15. The adsorbent body according to claim 7, wherein
the solid adsorbent particles are porous adsorbent particles carrying an amine compound.

16. The adsorbent body according to claim 7, wherein
the solid adsorbent particles are polymer adsorbent particles in which an amine group is incorporated as a fixed ion.

17. The adsorbent body according to claim 6, wherein
the solid adsorbent particles have a particle diameter of 0.3 to 1.2 mm.

18. The adsorbent body according to claim 6, wherein
when forming the adsorbent body by winding the planar sheet material onto itself or by laminating layers of the sheet material, a layer of solid adsorbent particles is formed between two immediately adjacent layers of the planar sheet material, and
within the layer of solid adsorbent particles, linear separators are spaced apart in a lateral direction to prevent lateral gas movement across the layer of adsorbent particles.

19. A method of producing an adsorbent body, comprising:
adhering solid adsorbent particles onto at least a single surface of planer sheet material; and
after the solid adsorbent particles have been adhered onto at least a single surface of the planer sheet material, winding the planar sheet material onto itself or laminating layers of the planar sheet material, wherein adhering solid adsorbent particles onto at least a single surface of planer sheet material comprises:
applying an adhesive to the planar sheet material;
conveying the planar sheet material in a movement direction;
using alignment fins to separate the solid adsorbent particles into rows, the alignment fins being oriented parallel to or perpendicular to the movement direction; and
establishing contact between the solid adsorbent particles and the planar sheet material while the solid adsorbent particles are separated into rows and the planar sheet material is being conveyed in the movement direction.

20. The adsorbent body according to claim 6, wherein
the adsorbent particles are two-dimensionally adhered and fixed to the planer sheet material so that the absorbent particles have a density ≤55 Vol %, and
the adsorbent particles are brought into contact with a planar sheet different from the planar sheet to which the absorbent particles are absorbed, or are brought into contact with adsorbent particles at a single points.

\* \* \* \* \*